United States Patent
Zhang et al.

(10) Patent No.: US 12,355,553 B2
(45) Date of Patent: *Jul. 8, 2025

(54) DIAGNOSTIC SYSTEM AND METHOD FOR NETWORK SYNCHRONIZED TIME IN SAFETY APPLICATIONS

(71) Applicant: Rockwell Automation Technologies, Inc., Mayfield Heights, OH (US)

(72) Inventors: Yanbin Zhang, Shanghai (CN); Xiaobo Peng, Shanghai (CN); Sikai Zhang, Shanghai (CN); Steven T. Seidlitz, Eagle, WI (US); Arun K. Guru, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 632 days.

This patent is subject to a terminal disclaimer.

(21) Appl. No.: 17/709,341

(22) Filed: Mar. 30, 2022

(65) Prior Publication Data
US 2023/0318728 A1    Oct. 5, 2023

(51) Int. Cl.
H04J 3/06    (2006.01)

(52) U.S. Cl.
CPC ............ H04J 3/0661 (2013.01); H04J 3/062 (2013.01)

(58) Field of Classification Search
None
See application file for complete search history.

(56) References Cited

U.S. PATENT DOCUMENTS

| | | | |
|---|---|---|---|
| 6,826,590 B1 * | 11/2004 | Glanzer | G05B 9/03 |
| | | | 709/200 |
| 9,891,142 B2 * | 2/2018 | Nair | G01M 99/008 |
| 12,132,612 B2 * | 10/2024 | Garcia | G06F 3/14 |

(Continued)

FOREIGN PATENT DOCUMENTS

| | | |
|---|---|---|
| WO | 2009076908 A1 | 6/2009 |
| WO | 2010115357 A1 | 10/2010 |

OTHER PUBLICATIONS

Odva, Inc.; "Common Industrial Protocol (CIP™) and the Family of CIP Networks"; Publication No. PUB00123R1 dated Feb. 2016—(134) pages.

(Continued)

*Primary Examiner* — Kodzovi Acolatse
(74) *Attorney, Agent, or Firm* — Boyle Fredrickson, S.C.

(57) ABSTRACT

To improve integrity of time synchronization, a node in a safety rated system verifies that its clock remains synchronized to another clock. Two adjacent, time-synchronized nodes transmit diagnostic messages to each other at an agreed upon interval and generate timestamps when the diagnostic message is received from the other node. The nodes then transmit their respective timestamp back to the sending node. Clock drift is detected by comparing a difference between the two timestamps at which the messages were received against a threshold. To avoid accidental detection of clock drift, a difference in transmission delays between the two nodes is stored in a FIFO buffer. Each node monitors the average of the data in the FIFO buffer. If the average deviates from the target value by too great a value, then the node determines the values of the clocks have skewed beyond an acceptable range and generates a fault condition.

20 Claims, 7 Drawing Sheets

(56) References Cited

U.S. PATENT DOCUMENTS

| | | | | |
|---|---|---|---|---|
| 2005/0240286 A1* | 10/2005 | Glanzer | ............... | G05B 9/03 700/1 |
| 2006/0215577 A1* | 9/2006 | Guichard | ............... | H04L 45/50 370/254 |
| 2010/0315994 A1* | 12/2010 | Lam | ............... | G09B 7/073 370/328 |
| 2013/0170507 A1* | 7/2013 | Hsueh | ............... | H04L 63/04 370/503 |
| 2013/0191434 A1* | 7/2013 | Smith | ............... | H04L 69/161 709/201 |
| 2015/0092796 A1* | 4/2015 | Aweya | ............... | H04J 3/0667 370/516 |
| 2016/0146710 A1* | 5/2016 | Nair | ............... | G01M 99/008 702/183 |
| 2016/0191597 A1* | 6/2016 | Joy | ............... | H04L 65/80 709/231 |
| 2017/0150464 A1* | 5/2017 | Kazehaya | ............... | H04L 12/422 |
| 2020/0021378 A1* | 1/2020 | Aweya | ............... | H04J 3/0673 |
| 2020/0195363 A1 | 6/2020 | Wang et al. | | |
| 2020/0280383 A1* | 9/2020 | Herber | ............... | H04W 56/0015 |
| 2021/0203682 A1* | 7/2021 | Bajpai | ............... | H04L 63/0428 |
| 2021/0288736 A1* | 9/2021 | Guignard | ............... | H04J 3/0667 |
| 2022/0123849 A1* | 4/2022 | McCall | ............... | H04J 3/0658 |
| 2023/0070916 A1* | 3/2023 | Furuki | ............... | G01S 19/14 |
| 2023/0092302 A1* | 3/2023 | Rusakovich | ............... | G11C 29/56 365/201 |
| 2023/0171015 A1* | 6/2023 | Rabinovich | ............... | H04J 3/0667 370/350 |
| 2023/0291490 A1* | 9/2023 | Korovin | ............... | H03L 7/22 |
| 2023/0318728 A1* | 10/2023 | Zhang | ............... | H04J 3/0667 370/503 |
| 2024/0359325 A1* | 10/2024 | Huang | ............... | B65G 54/02 |

OTHER PUBLICATIONS

Endrun Technologies; "Precision Time Protocol (PTP/IEEE-1588)"; www.endruntechnologies.com—(6) pages.

Extended European Search Report dated Feb. 21, 2022; Application No./Patent No. 21195566.1-1205—(8) pages.

* cited by examiner

DIAGNOSTIC SYSTEM AND METHOD FOR NETWORK SYNCHRONIZED TIME IN SAFETY APPLICATIONS

BACKGROUND INFORMATION

The subject matter disclosed herein relates to use of network synchronized time in safety functions and, more specifically, to providing safety level integrity of time-stamped data within an industrial control system.

Industrial controllers are specialized computer systems used for the control of industrial processes or machinery, for example, in a factory environment. Generally, an industrial controller executes a stored control program that reads inputs from a variety of sensors associated with the controlled process and machine and, sensing the conditions of the process or machine and based on those inputs and a stored control program, calculates a set of outputs used to control actuators controlling the process or machine.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Under the direction of a stored program, the industrial controller examines a series of inputs from sensors corresponding to the status of the controlled process and changes a series of outputs to actuators controlling the industrial process. The sensor inputs may be binary, that is on or off, for example, from a limit switch, or may be analog, that is, providing a multi-valued output that may vary within a continuous range, for example, from a temperature sensor, camera, or the like. Similarly, the actuator outputs may be binary, for example, controlling a solenoid or shut off valve, or analog controlling a metering valve, motor, linear positioning element, or the like. Typically, analog signals are converted to binary words for processing.

An important application of industrial controllers is in "safety control". Safety control is used in applications where failure of an industrial controller can create a risk of injury to humans. While safety control is closely related to reliability, safety control places additional emphasis on ensuring correct operation even if it reduces equipment availability. Safety industrial control systems are not optimized for "availability", that is being able to function for long periods of time without error, but rather for "safety" which is being able to accurately detect error to shut down. Safety industrial controllers normally provide a predetermined safe state for their outputs upon a safety shutdown, the predetermined values of these outputs being intended to put the industrial process into its safest static mode. For that reason, safety controllers may provide run time diagnostic capabilities to detect incorrect operation and to move the control system to predefined "safety states" if a failure is detected. The safety states will depend on the particular process being implemented and causes the actuators to assume a state predetermined to be safest when control correctness cannot be ensured. For example, upon detection of a failure, an actuator controlling cutting machinery might move that machinery to a stop state while an actuator providing air filtration might retain that machinery in an on state.

Safety control capability may be designated, for example, by "safety integrity levels" (SIL) defined under standard IEC 61508 and administered by the International Electrotechnical Commission (IEC) under rule hereby incorporated by reference. Standard IEC EN 61508 defines four SIL levels of SIL-1 to SIL-4 with higher numbers representing higher amounts of risk reduction. Obtaining a desired SIL rating requires a certain degree of diagnostic coverage for components within a system. The degree of diagnostic coverage is defined according to a percentage likelihood that a failure of a component within a system will be detected. Low diagnostic coverage, for example, may require only a sixty percent (60%) chance that a failure will be detected. In contrast, high diagnostic coverage, required for a SIL 3 rating, may require a ninety-nine percent (99%) chance that a failure will be detected. Mitigation of a risk occurring increases the SIL rating and may be achieved by detecting a failure in a system that may cause a dangerous operating environment before the dangerous operating environment can occur. Therefore, determination of a SIL rating is based, at least in part, on the ability of a system to detect a fault condition and enter a safe state in response to detecting the fault condition.

Generally, the controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, ControlNet or EtherNet/IP) differ from standard communication networks (such as Ethernet) by guaranteeing maximum communication delays by pre-scheduling the communication capacity of the network, and/or providing redundant communication capabilities for high-availability.

Control networks can also employ "connected messaging" in which the bandwidth of the network and buffer space is pre-allocated to dedicated "connections" to prevent lost or unpredictably delayed data transfer that can occur in standard network protocols such as Ethernet. An example of connected messaging is Common Industrial Protocol (CIP), which is a media independent industrial protocol for industrial automation applications supported by the Open DeviceNet Vendors Association (ODVA). CIP is described in "Common Industrial Protocol (CIP) and the Family of CIP Networks," published by ODVA with the most recent version dated February 2016, which document is incorporated herein by reference in its entirety.

One potential source of failure in a controlled system is the control network. A failure in a network device or a damaged network cable could result in the loss of communication with one or more sensors or actuators. The industrial controller could stop receiving updates on the operating status of a portion of the controlled machine or process and may be unable to detect when a particular action is required. Similarly, an output signal from the industrial controller may fail to reach actuator, resulting in unexpected operation of the controlled machine or process. Thus, it is desirable to detect failures in the control network.

Historically, it has been known to obtain a safety rating on a control network in one of two methods. A first method is sometimes referred to as a "white box" method of detecting failures. In the white box method, every device on the control network is configured to satisfy the desired safety rating. These devices may include, for example, redundant network paths, redundant controllers, and programs executing within the devices to continually test operation of the device and the network paths. Often the tests will send a brief safety check message along both network paths and compare reception of each message to verify correct operation of the path. Having redundant systems allows correct operation of the controlled machine or process to continue in the event of a failure of one path in the control network by utilizing the redundant path that is still operating. In the event of a failure in any aspect of the network, appropriate action may be taken to enter a safe operating condition before unexpected operation may occur. However, a white box system requires significant expense to ensure that every component within the network complies with a desired SIL rating.

A second method for obtaining a SIL rating on the control network is sometimes referred to as a "black channel" method of detecting failures. In the black channel method, only certain nodes in a network are considered essential for obtaining a desired safety rating and the intermediate network devices are not required to comply with the desired safety rating. These intermediate network devices form the "black" channel between the "white" devices. As previously indicated, obtaining a desired SIL rating involves mitigating risk that a dangerous failure occurs in the event of a failure. Therefore, to obtain a desired safety rating, the white devices must be configured to detect a failure occurring on the black channel.

Currently, the safety rated nodes are able to detect the occurrence of certain failures such as the failure of an intermediate network device or the loss of a network cable. Two safety rated nodes may periodically transmit a data packet between each other. The loss of this periodic data packet indicates the loss of a network device or of a network cable between the two devices. However, other failures along the black channel may go undetected. For example, certain applications may require time synchronous operation. All devices in the network include an internal clock which is synchronized to a master clock. A first device in the network may rely on timestamps of events occurring at other devices to coordinate actions taken by the first device. The timestamp, however, of a black channel device may be susceptible to error. An incorrect bit may be written, a valid timestamp may be overwritten by other data, or some other failure may occur to corrupt the timestamp. Because devices are synchronized to a clock signal sequentially along a network, a safety rated node may need to be synchronized to the clock signal from a device along the black channel. The potential for an error in the clock signal may limit the ability to utilize time synchronization in a safety rated application.

Thus, it would be desirable to provide a system and method for using time synchronization in a safety rated application.

BRIEF DESCRIPTION

According to one embodiment of the invention, a method of monitoring clock circuits for use in a safety rated application includes synchronizing a first clock in a first node with a second clock in a second node, transmitting a first diagnostic message from the first node to the second node at a first time based on the first clock, and transmitting a second diagnostic message from the second node to the first node at the first time based on the second clock. A first diagnostic timestamp is generated in the first node corresponding to receipt of the second diagnostic message, and a second diagnostic timestamp is generated in the second node corresponding to receipt of the first diagnostic message. The first diagnostic timestamp is transmitted from the first node to the second node, and the second diagnostic timestamp is transmitted from the second node to the first node. A diagnostic value is stored in a buffer for either the first node or the second node, where the diagnostic value is determined as a function of the first diagnostic timestamp and the second diagnostic timestamp. A clock skew between the first clock and the second clock is determined as a function of the diagnostic value in either the first node or the second node.

According to another embodiment of the invention, a node in an industrial control system is configured to generate a clock signal for use in a safety rated application. The node includes a communication port configured to connect to an industrial network for communication with at least one additional node on the industrial network, a clock circuit generating a first clock signal, and a processor. The processor is configured to synchronize the first clock signal with a second clock signal in the at least one additional node, transmit a first diagnostic message to the at least one additional node at a first time based on the first clock signal, and receive a second diagnostic message from the at least one additional node, where the second diagnostic message is transferred from the at least one additional node at the first time based on the second clock signal. The processor is further configured to generate a first diagnostic timestamp as a function of the first clock signal corresponding to receipt of the second diagnostic message and receive a second diagnostic timestamp from the at least one additional node, where the second diagnostic timestamp corresponds to a time at which the at least one additional node received the first diagnostic message. The processor stores a diagnostic value in a buffer, where the diagnostic value is determined as a function of the first diagnostic timestamp and the second diagnostic timestamp, and determines a clock skew between the first clock signal and the second clock signal as a function of the diagnostic value.

According to still another embodiment of the invention, a method of generating a safety rated time value for use in a safety rated application includes determining an offset time value between a master clock and a node in the safety rated application, storing the offset time value in a safety memory of the node, and generating timestamps in the node as a function of a local clock and the offset time. Diagnostic messages are transmitted between the node and at least one additional node in the safety rated application, and a clock skew between the local clock and the master clock is detected as a function of the diagnostic messages.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
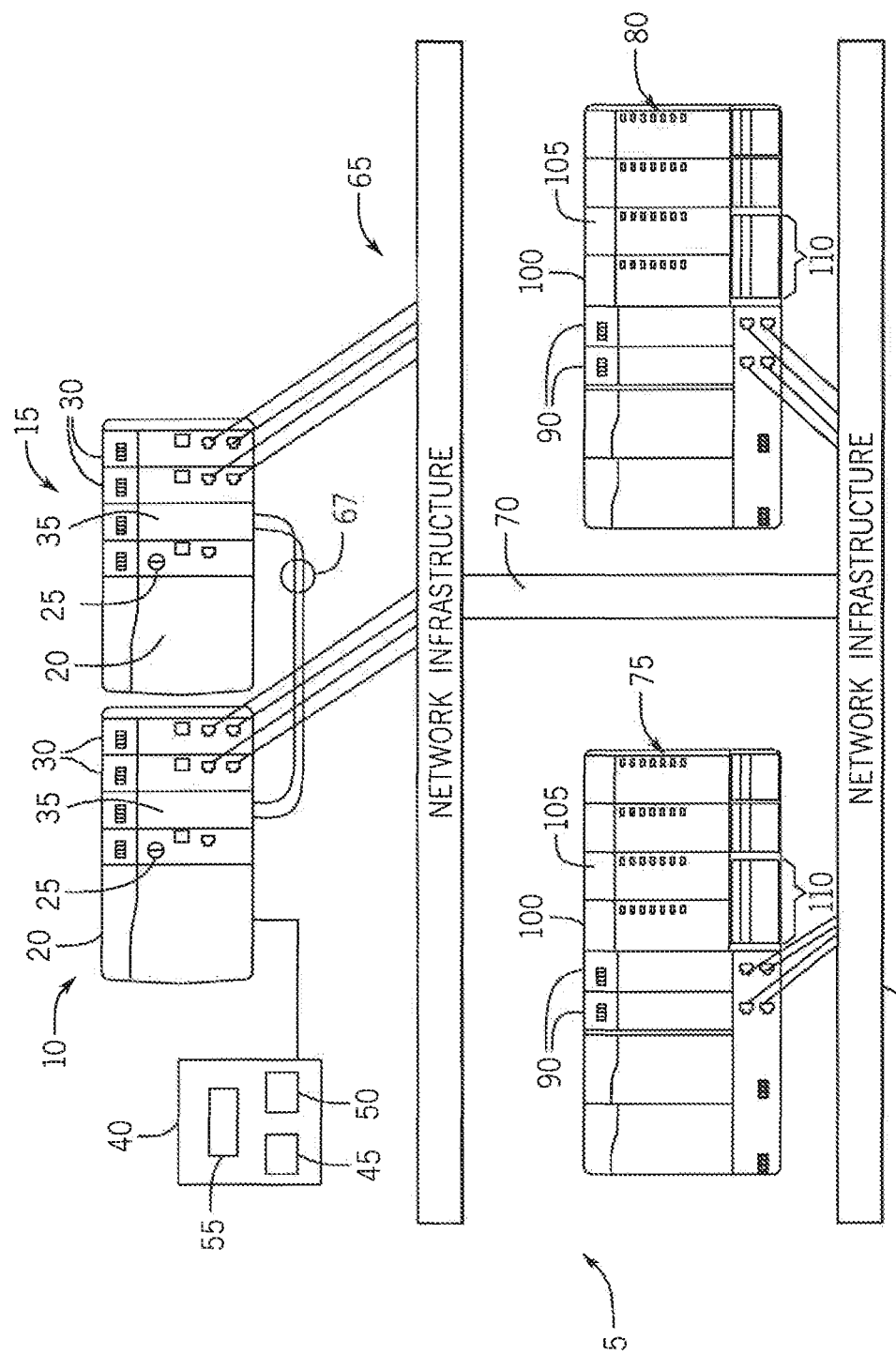
FIG. 1 is a block diagram of one embodiment of an industrial control system.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method for using time synchronization in a safety rated application. Time synchronization occurs on a device-by-device basis. The master device generates an initial time synchronization request and sends out the synchronization request to a device that is adjacent to the master device on the network. Adjacent with respect to the network means one device is connected to another directly via a network cable or wireless connection without having the synchronization request pass through another device, such as a switch, router, gateway, or the like. The adjacent device first synchronizes its clock to the master time and then sends out subsequent synchronization requests to the next adjacent device on the network. The master device is commonly connected to the Global Positioning System (GPS) from which it obtains an initial clock time.

To synchronize the clock signal of additional nodes, each node receives a synchronize request message from an adjacent network device. Each adjacent network device may or may not be another white device within the safety rated system. The first node transmits a synchronize request message that includes the master time to which each node is to synchronize. The second node generates a second timestamp corresponding to a time at which the synchronize request message is received from the first node. The second node also receives a first timestamp corresponding to the time at which the synchronize request message was transmitted. The first timestamp may be transmitted in the initial synchronize request message or in a follow-up message from the first node, according to the configuration of the first node. From the first and second timestamps, the second node is able to determine a transmission delay time from the first node to the second node. The second node, in turn, sends a delay time request to the first node from which it received the synchronize request message. The second node generates a third timestamp when this message is sent and stores the third timestamp in memory. The first node generates a fourth timestamp when the delay time request message is received and sends a delay time response message back to the second node which includes the fourth timestamp. From the third and fourth timestamps, the second node is able to determine a transmission delay time from the second node to the first node. The second node utilizes the two transmission delay values to determine an offset between the clock values of the two devices. This offset value is stored in a safety memory within the second node to ensure that the average value has data integrity and does not become corrupted. The offset value, in combination with the local time, can be used to determine timestamps of events within the node.

In order to improve integrity of time synchronization, the two nodes in a safety rated system takes steps to ensure that the time to which they are synchronized remains properly synchronized. As an initial step, two adjacent, time-synchronized nodes begin transmitting diagnostic messages to each other at an agreed upon future time. It is assumed that each node transmits at the agreed upon time. Each node will generate a timestamp corresponding to the time at which the diagnostic message is received. The nodes will transmit their respective timestamp at which the message was received back to the sending node. Each node then has both values for the time at which a message was received. If there are symmetrical communications between nodes and perfectly synchronized clock signals, the difference between the timestamp at which each message was received should be zero. As long as the two clocks remained synchronized, a difference between the two times should remain the same. If the clock values start to drift apart, the difference between the two times will similarly drift apart. Therefore, clock drift is detected by monitoring a difference between the two timestamps at which the messages were received.

While the initial step above should generate identical receive times on a symmetric communication network with synchronized clocks, there is inherently some variation in transmission delays between the two nodes. This variation is random in nature and, therefore, should follow a normal distribution. In order to avoid accidental detection of drift between the two clocks, a difference in transmission delays between the two nodes, determined as a difference between the two timestamps for the reception time, is stored in a first-in, first out (FIFO) buffer. A filter, such as a moving average or moving median average filter, is applied to the FIFO buffer to determine a statistical average and a statistical deviation for the data in the buffer.

Each node is able to monitor the statistical average of the data in the FIFO buffer to detect a drift between clock values in the two nodes. Initially, each node performs a learning cycle to determine the expected statistical average of a difference in the timestamps between the two nodes. After the initial learning cycle is complete, each node sets the expected statistical average as a target value and continues monitoring the statistical average over time. If the average deviates from the target value by too great a value, then the node determines that the values of the clocks have skewed beyond an acceptable range and generates a fault condition.

Figure 2:
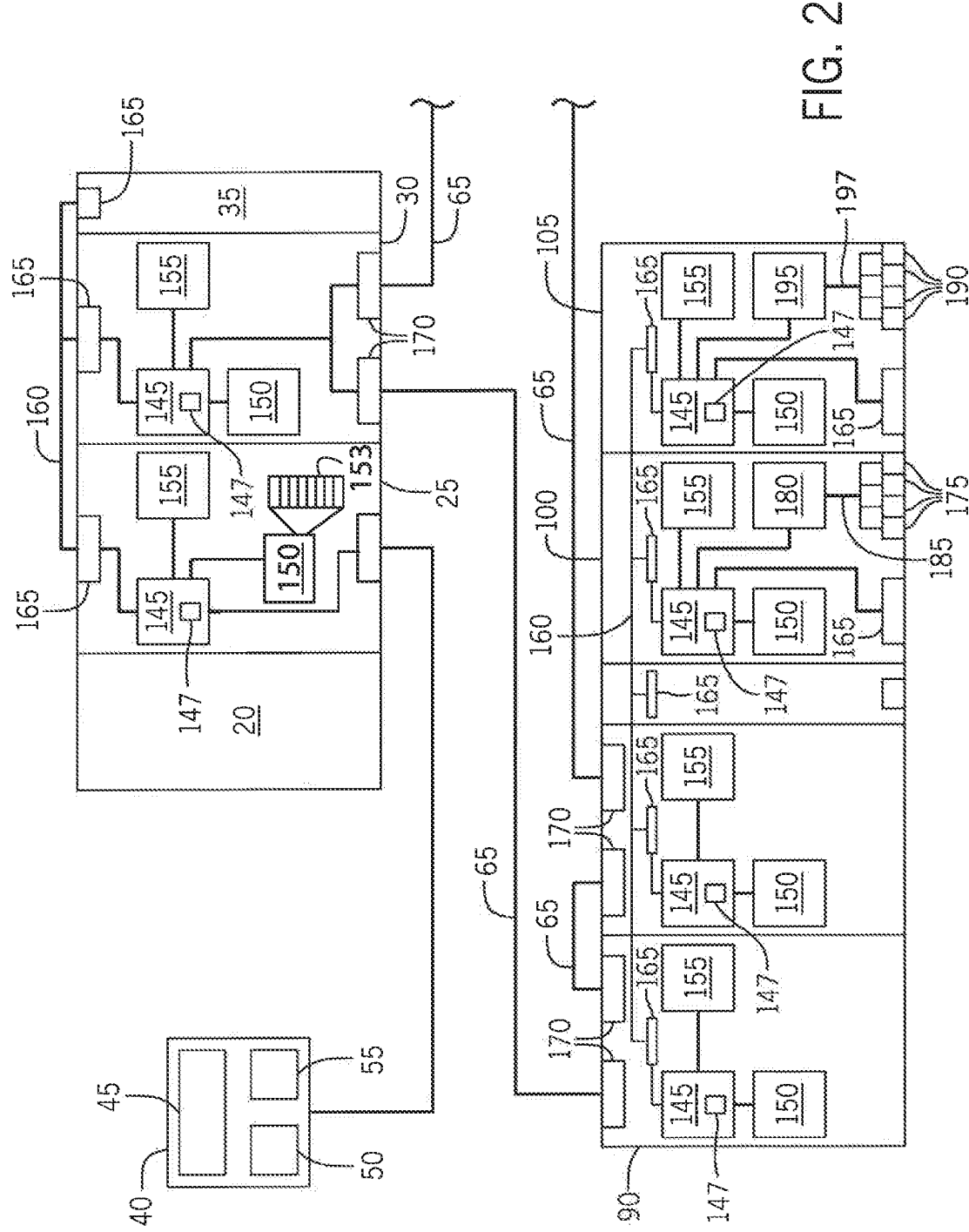
FIG. 2 is a block diagram further representing aspects of the industrial control system of FIG. 1.

Turning first to FIG. 1 and FIG. 2, an exemplary industrial control system 5 with redundant subsystems is illustrated. The redundant subsystems may be provided to achieve a desired safety rating, where inputs and outputs are provided to two controllers and each controller monitors operation of the inputs and outputs as well as operation of the other controller to ensure correct operation of the control system 5. The illustrated control system 5 is an exemplary environment incorporating one embodiment of the present invention.

The industrial control system 5 includes a first controller chassis 10 and a second controller chassis 15. As illustrated, the first and second controller chassis 10 and 15 are modular and may be made up of numerous different modules. Additional modules may be added or existing modules removed and the first and second controller chassis 10 and 15 reconfigured to accommodate the new configuration. Optionally, either the first controller chassis 10 and/or the second controller chassis 15 may have a predetermined and fixed configuration. The first and second controller chassis 10 and 15 may have a single backplane or dual backplanes to facilitate communication between modules in the chassis. In the exemplary system shown, both the first and second controller chassis 10 and 15 include a power supply module 20, a controller module (or also referred to as simply "controller") 25, and network bridge modules 30. Each controller chassis 10 and 15 is further shown with an additional module 35 that may be selected according to the application requirements. For example, the additional module 35 may be an analog or digital input or output module, which will be referred to herein generally as an IO module. Optionally, each chassis may be configured to have multiple additional modules 35 according to the application requirements. For ease of illustration, a single additional module 35 is illustrated and the illustrated module is a redundancy module to facilitate dual chassis controller redundancy.

An operator interface 40 is shown connected to the industrial control system. The operator interface 40 can include a processing device 45 and an input device 50. The input device 50 can include, but not limited to, a keyboard, touchpad, mouse, track ball, or touch screen. The operator interface can further include an output device 55. The output device 55 can include, but is not limited to, a display, a speaker, or a printer. It is contemplated that each component of the operator interface 40 may be incorporated into a single unit, such as an industrial computer, laptop, or tablet computer. It is further contemplated that multiple operator interfaces can be distributed about the industrial control system 5. The operator interface 40 may be used to display operating parameters and/or conditions of the controlled machine or process, receive commands from the operator, or change and/or load a control program or configuration parameters. An interface cable connects the operator interface 40 to the controller 25 on the first controller chassis 10.

The first and second controller chassis 10 and 15 are connected to other devices by a network 65 according to the application requirements. A redundant network topology is established by connecting the network bridge modules 30 of the controller chassis 10 and 15 to a redundant network infrastructure 70 by a suitable network of cables and/or network devices, such as router, switches, gateways, or the like. The network infrastructure 70 connects to a first remote chassis 75 and a second remote chassis 80. It is contemplated that the network cables may be custom cables configured to communicate via a proprietary interface or may be any standard industrial network, including, but not limited to, Ethernet/IP®, DeviceNet®, ControlNet®, or OPC UA®. The network bridge modules 30 and the network 70 are configured to communicate according to the protocol of the network to which it is connected and may be further configured to translate messages between two different network protocols. Dedicated interface cables 67 connect the redundancy modules 35 in each chassis to each other, providing a dedicated communication channel between the controller modules 25.

The first and second remote chassis 75 and 80 are positioned at varying positions about the controlled machine or process. As illustrated, the first and second remote chassis 75 and 80 are modular and may be made up of numerous different modules connected together in a chassis or mounted on a rail. Additional modules may be added or existing modules removed and the remote chassis 75 or 80 reconfigured to accommodate the new configuration. Optionally, the first and second remote chassis 75 and 80 may have a predetermined and fixed configuration. The first and second remote chassis 75 and 80 may have a single backplane or dual backplanes to facilitate communication between modules in the chassis. As illustrated, the first and second remote chassis 75 and 80 each includes a pair of network adapter modules 90, an input module 100, and an output module 105. Each network adapter module 90 is connected to the redundant network infrastructure 70 by a suitable network of cables. Each of the input modules 100 is configured to receive input signals from controlled devices, and each of the output modules 105 is configured to provide output signals to the controlled devices. Optionally, still other modules may be included in a remote chassis. Dual or triple redundant input modules 100 and/or output modules 105 may be included in a remote and/or controller chassis. It is understood that the industrial control network, industrial controller, and remote chassis may take numerous other forms and configurations without deviating from the scope of the invention. It should also be understood that an input module 100 and an output module 105 can form an IO module 110.

Referring next to FIG. 2, a portion of the exemplary industrial control system of FIG. 1 is illustrated in block diagram form. It is contemplated that each of the modules in the system may include a processor 145 and a memory 150. The processors 145 are configured to execute instructions and to access or store operating data and/or configuration parameters stored in the corresponding memory 150. The processors 145 are suitable processors according to the node requirements. It is contemplated that the processors 145 may include a single processing device or multiple processing devices executing in parallel and may be implemented in separate electronic devices or incorporated on a single electronic device, such as a field programmable gate array (FPGA) or application specific integrated circuit (ASIC). The processors 145 include random access memory 147 for processing runtime data. The memory devices 150 are non-transitory storage mediums that may be a single device, multiple devices, or may be incorporated in part or in whole within the FPGA or ASIC. Each of the modules also includes a clock circuit 155, and each clock circuit 155 is preferably synchronized with the other clock circuits 155 according to, for example, the IEEE-1588 clock synchronization standard. Each clock circuit 155 generates a time signal configurable to report the present time accurate to either microseconds or nanoseconds. Communication between modules mounted in the same chassis or contained within a single housing occurs via a backplane 160. The backplane 160 may be a single backplane or dual backplanes and include a corresponding backplane connector 165. Modules communicating via network media include ports 170 configured to process the corresponding network protocol. The input module 100 includes input terminals 175 configured to receive the input signals from the controlled devices. The input module 100 also includes any associated logic circuitry 180 and internal connections 185 required to process and transfer the input signals from the input terminals 175 to the processor 145. Similarly, each output module 105 includes output terminals 190 configured to transmit the output signals to the controlled devices. The output module 105 also includes any associated logic circuitry 195 and internal connections 197 required to process and transfer the output signals from the processor 145 to the output terminals 190.

Figure 3:
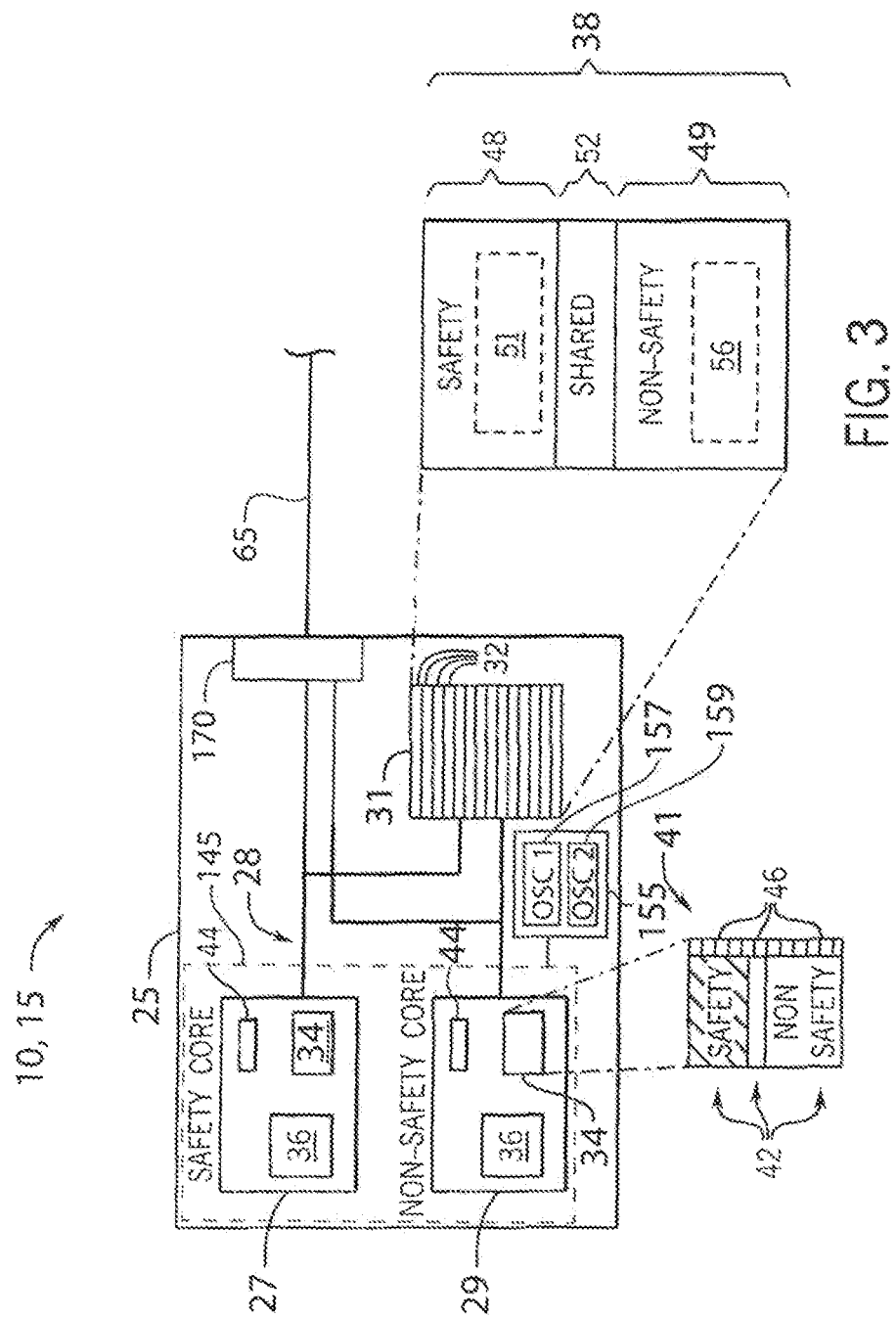
FIG. 3 is a block diagram of an exemplary controller module for the industrial control system of FIG. 1 for executing safety and non-safety tasks.

Turning next to FIG. 3, it is contemplated that the controller module 25 for each controller chassis 10, 15 may include two different processing cores 27 and 29. For descriptive clarity, at times the first processing core will be termed the "safety core" 27 and the second processing core will be termed the "non-safety" core 29. Generally, these cores 27 and 29 have similar or identical hardware and differ primarily with respect to the programs they execute. In one embodiment, cores 27 and 29 may be different cores on a standard multicore microprocessor. Optionally, the cores 27, 29 may be specialized different cores (for example, having diverse architectures to reduce the chance of correlated errors) or the cores may be implemented on separate microprocessors.

In a general case, each of the cores 27 and 29 share a bus structure 28 communicating with shared memory 31. The shared memory 31 will generally include a memory hierarchy, for example, an L2 or higher level cache, RAM, and mass storage in the form of a disk or solid-state disk. Each of the structures will be treated logically, that is as a single memory space having multiple addresses 32 within an address range 38, for descriptive clarity.

Each of the cores 27 and 29 will include a central processing unit (CPU) 36 and a memory management unit (MMU) 34. In some embodiments, the MMU 34 may implement multiple functions including address translation (between virtual and physical addresses) as well as memory protection. For both functions, the memory management units 34 may include a page table 41 having a set of entries 42 having a one-to-one mapping to individual addresses 32 or address ranges (typically blocks of addresses 32). These entries 42 may provide for the translation between virtual and physical address of a type known in the art for which purpose the MMU 34 may be associated with a translate lookaside buffer 44 providing caching operations for improved translation speed.

In addition, each of the entries 42 may be associated with a flag 46 describing whether the non-safety core 29 has write privileges with respect to writing to the particular addresses of the entry. These flags 46 of the page table 41 of each MMU 34 of each of the cores 27 and 29 may be used to segregate the memory 31 into exclusive regions for the safety memory or non-safety memory. Generally, the flags 46 may define a safety region 48 where there are write privileges only with respect to safety core 27 and a non-safety region 49 and where there are write privileges only with respect to the non-safety core 29. The flags 46 may further define a shared region 52 where both cores 27 and 29 have write privileges. The safety region 48 may hold a safety program 51 executed by safety core 27 to provide for safe control of the controlled process through a reading of sensors and a writing of actuators and may include a data space holding data associated with that safety program 51. Similarly, the non-safety region 49 may hold a non-safety program 56 associated with the non-safety aspects of the control tasks executed by non-safety core 29. In addition to limiting access to the safety memory 48 by the safety core 27, additional steps may be taken during reads or writes of the safety memory such as addition of a checksum to data written in the safety memory 48 and verifying that the checksum is correct when data is read from the safety memory 48 to ensure that the data in the safety memory and utilized by the safety core 27 has not been corrupted. The additional care taken with respect to reading and writing safety memory 48 is intended to satisfy safety requirements and to achieve desired SIL ratings.

In operation, "white" devices in the industrial control system 5 are configured to ensure the integrity of the synchronized time value in a safety application. As discussed above, the "white" devices are configured to achieve a desired safety rating. In certain applications, a timestamp for the occurrence of an event in these "white" devices may be desired. It would be desirable to ensure the synchronized time value is accurate and, in the event of an error occurs in the synchronized time value, that the error is detected and/or corrected without causing a failure in the application.

As an initial step, the time in each of the devices must be synchronized to a master clock. It is contemplated that either the first or second industrial controller 10, 15 may provide the master time. The clock in the first controller module 25 or in the second controller module 25 may be defined as the master clock. Optionally, the first or second controller module or a separate module within the first or second industrial controller rack 10, 15 may be in communication with a GPS satellite to obtain a master time. Having defined or obtained a master clock value, the other devices in the system will be synchronized to the master clock. A synchronize request data packet is transmitted from the device with the master time to an adjacent device in the industrial network. Each adjacent device in series along the industrial network 65 synchronizes its clock to the master clock and, in turn, transmits a new synchronize request to the next adjacent device in the network until all of the devices in the controlled machine or process are synchronized to the master clock.

Figure 6:
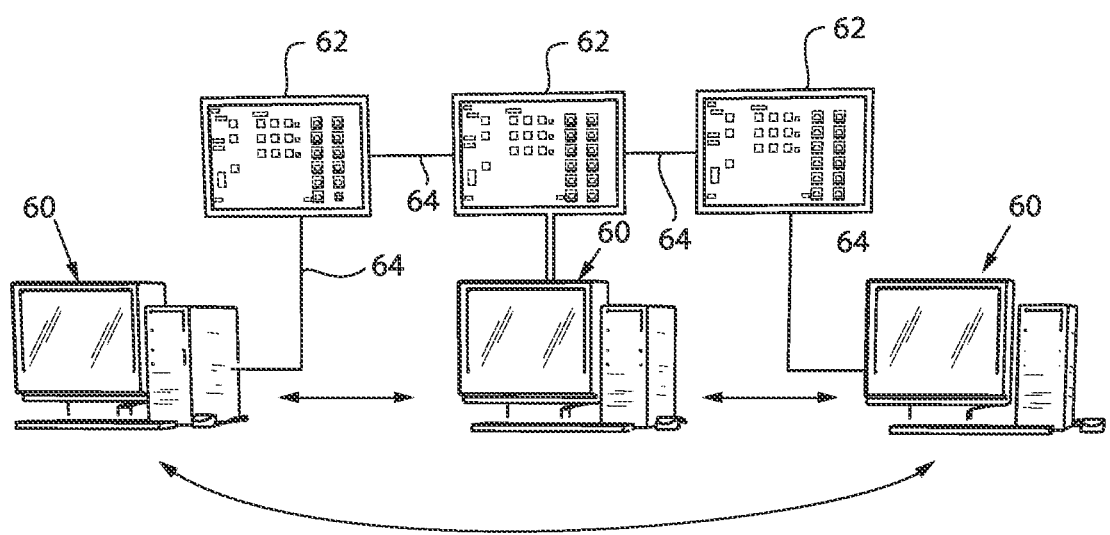
FIG. 6 is an environmental view of multiple processing devices interconnected by a network which incorporate one embodiment of the present invention.

Turning also to FIG. 6, the diagnostic system for detecting time synchronization devices may be implemented on processing devices 60 other than an industrial controller 10, 15. The processing devices 60 may be human machine interfaces (HMIs) spaced around the industrial control system. Optionally, the processing devices 60 may be laptop or desktop computers located at work stations either proximate to or remote from the industrial control system, where each of the processing devices 60 is connected to each other via a network. The network may be part of the network infrastructure 65 illustrated in FIG. 1. Optionally, the network may be part of an intranet or the Internet. Each processing device 60 is illustrated as being connected to a switch 62 via a network cable 64. According to one embodiment of the invention, each switch 62 is an Ethernet switch and the network cable 64 is an Ethernet cable. Optionally, multiple processing devices 60 may be connected to a single switch 62. The network infrastructure may include multiple wired or wireless network devices, such as the switch 62, a router, a gateway, or the like located between processing devices. One of the processing devices 60 may be connected to a GPS system and provide the master clock to each of the other processing devices. According to one aspect of the invention, the processing devices are connected to the industrial controllers 10, 15 and one of the processing devices 60 provides the master clock signal to the first industrial controller 10 as an initial step in synchronizing each of the clocks in the industrial control system 5.

Figure 4:
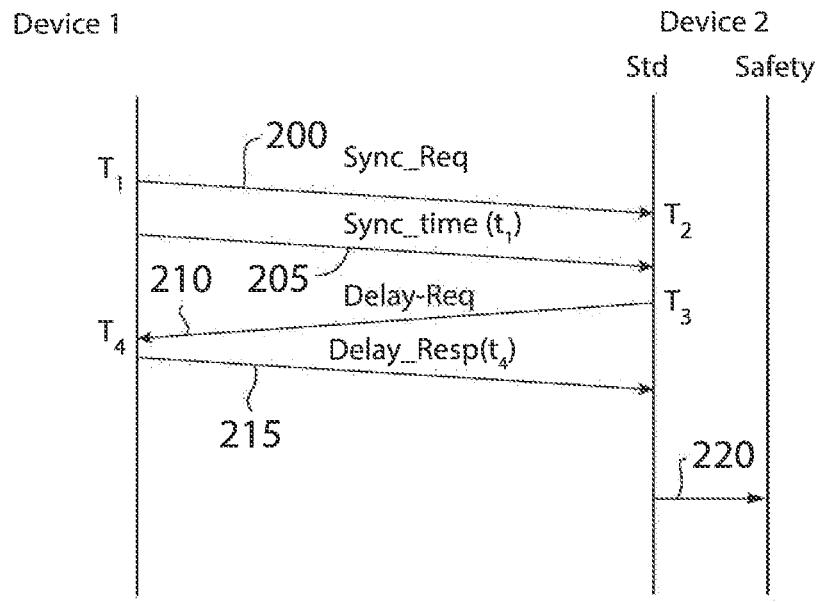
FIG. 4 is a timing diagram illustrating one embodiment of time synchronization between two devices.

With reference to FIG. 4, an example of time synchronization between two devices in the industrial control system 5 is illustrated. Device 1 may be any device within the control system 5 transmitting a synchronize request message 200 to the next adjacent device, Device 2, along the network 65. The synchronize request message 200 is transmitted at time, $t_1$. Device 1 captures a timestamp of time, $t_1$, using its previously synchronized clock 155. According to one aspect of the invention, the processor 145 in Device 1 may capture the timestamp at the time it sends the synchronize request message 200 to its corresponding communication port 170 for transmission. According to another aspect of the invention, it is contemplated that the communication port 170 or a dedicated circuit located between the processor 145 and the communication port 170 may be configured to capture a timestamp utilizing a hardware circuit. Implementing a hardware circuit to capture a timestamp may allow for a more precise timestamp corresponding to the time the synchronize request message 200 leaves Device 1. Because the timestamp is captured as close as possible to the time the message leaves Device 1, the timestamp may not be included within the synchronize request message 200. Device 1 transmits a second message, Sync_time, with the timestamp, $t_1$, included in the data packet. Optionally, the hardware circuit may be configured to append the timestamp, $t_1$, to the initial synchronize request message 200 and include the timestamp in the synchronize request message 200 if the timestamp may be appended quickly enough to not delay the transmission of the request message 200 beyond the application requirements.

Device 2 receives the synchronize request message 200 at time, $t_2$, and obtains a second timestamp corresponding to the time the synchronize request message is received. As may be appreciated, the first timestamp, $t_1$, is captured as a function of the local time in Device 1, which has been synchronized to the master time, and the second timestamp, $t_2$, is captured as a function of the local time in Device 2, which has not yet been synchronized to the master time. As a result, there will be an offset between the local times in the two devices. According to one aspect of the invention, the processor 145 in Device 2 may capture the timestamp at the time it receives the synchronize request message 200 from its corresponding communication port 170. According to another aspect of the invention, it is contemplated that the communication port 170 or a dedicated circuit located between the processor 145 and the communication port 170 may be configured to capture a timestamp utilizing a hardware circuit. Implementing a hardware circuit to capture a timestamp may allow for a more precise timestamp corresponding to the time the synchronize request message 200 arrives at Device 2. Device 2 also receives the second message 205, Sync_time, with the timestamp, $t_1$, included in the data packet. Device 2 stores the first and second timestamps in memory 31. Receiving data messages and capturing timestamps may be executed by standard tasks and utilize the non-safety memory 49. Consequently, the first and second timestamps may be stored in non-safety memory 49 for later use.

Device 2 then determines a transmission delay time for a message sent from Device 2 to Device 1. A delay request message 210 is generated within Device 2 and sent from the communication port 170 of Device 2 to Device 1. Device 2 captures a third timestamp, $t_3$, using the local time in Device 2, where the third timestamp corresponds to the time that the delay request message was transmitted. As previously discussed, either the processor 145 in Device 2 or a hardware circuit in the communication port 170 or a dedicated circuit located between the processor 145 and the communication port 170 may be configured to capture the timestamp. The third timestamp, $t_3$, is stored with the first and second timestamps. The delay request message 210 is received at Device 1 at time, $t_4$. The processor 145 in Device 1 or a hardware circuit in the communication port 170 or a dedicated circuit located between the processor 145 and the communication port 170 may be configured to capture the timestamp of the time the delay request message 210 is received. Device 1 then sends a delay response message 215 back to Device 2, where the delay response message included the fourth timestamp, $t_4$. Device 2 receives the fourth timestamp and stores it with the first three timestamps.

Device 2 may then use the four timestamps to determine a time offset for the local time in Device 2 from the master time. The third timestamp, $t_3$, is captured as a function of the local time in Device 2, which has not yet been synchronized to the master time, and the fourth timestamp, $t_4$, is captured as a function of the local time in Device 1, which has been synchronized to the master time. As a result, there will be an offset between the local times in the two devices. The offset may be determined as shown below in equation 1.

$$\text{offset} = ((t_2 - t_1) - (t_4 - t_3))/2 \quad (1)$$

In equation 1, the transmission delay is determined from Device 1 to Device 2 for the synchronize request message 200 and from Device 2 to Device 1 for the delay request message 210. Subtracting the two values of the transmission delay where the transmission delays are determined using clock values from different local clocks has the effect of cancelling out the transmission delay and leaving a remainder of twice the offset between the two clocks. As a result, dividing the difference of the transmission delay values by two provides the offset value between the local clock values of the two devices. If Device 1 has already been synchronized to the master clock, Device 2 will now have an offset value for its local time with respect to the master clock value and can synchronize itself to the master clock. Adding the offset value to the local time will result in a clock signal that is synchronous to the value of the master clock.

Having determined the offset value, Device 2 can store a copy of the offset value into safety memory 48 as shown by the write 220 between standard and safety memory in the timing diagram of FIG. 4. A non-safety task may be utilized to manage the data packet transmissions and to store the intermediate values of the timestamps used to determine the offset value. Upon determining the offset value, the non-safety task may set an internal status bit or flag indicating that the offset value has been determined, and a safety task executing on the safety core 27 may write 220 a copy of the offset value into the safety region 48 of memory 31. Storing the offset value into the safety region 48 of memory 31 ensures the integrity of the offset value for later use by Device 2 with respect to synchronized events. The later use may be, for example, generating subsequent timestamps for events occurring at Device 2. Optionally, the later use may be triggering an event by Device 2 based on desired time for the event to occur. The use is dependent on the type of device and on the application requirements. As the offset value is written into safety memory 48, the processor 145 may generate a checksum corresponding to the value of the offset that was determined and write the checksum into safety memory 48 along with the offset value. On subsequent reads of the offset value, the processor 145 may generate a checksum of the offset value read and compare the new checksum value to the stored checksum value to ensure the integrity of the stored value. Optionally, the processor 145 may utilize other safety integrity measures when storing the offset value into safety memory 48, such as an error correcting code (ECC) or a memory protection unit (MPU) to verify that the data read has not been changed or corrupted after being written to safety memory 48.

The devices in an industrial control system 5 using synchronized time are periodically resynchronized to ensure that the local time in each device remains synchronized. It is contemplated that resynchronization may occur, for example, at intervals ranging from one-half second to five seconds. As previously discussed, a portion of the devices in the industrial control system 5 will be configured as "white" devices, or safety devices, to obtain a desired safety rating. A portion of the devices and, in particular, a portion of the devices in the industrial network 65 may be "black" devices, or non-safety devices. The non-safety devices may be off-the-shelf routers, switches, gateways, or the like and are not configured with the redundancy or fail-safe measures of a safety device and are selected to balance the safety requirements with cost, installation time, and the like. As a result, the potential exists that Device 1, as shown in FIG. 4, may be a non-safety device and Device 2 may be a safety device, where Device 2 is receiving the periodic synchronization requests 200 from Device 1. Device 1 may experience a temporary error condition, such as noise, an erroneous read or write, or the like, that causes its local time to be synchronized for at least one cycle to a time other than the master time. Device 2 may add an additional safety check with respect to its offset value by comparing the new offset value determined following each synchronization request 200 to the prior determined value. If the difference between values exceeds a predefined threshold, Device 2 may keep the prior offset value, determining an error occurred in the present resynchronization request. If the difference between values exceeds the predefined threshold for multiple cycles, Device 2 may issue a warning message indicating an error with time synchronization.

Having stored the offset value in the safety region 48 of memory 31, a safety task may be required to read the offset value when a timestamp is desired. The non-safety control program 56 may include a function call to the safety task to read the offset value. The safety task may be configured to return the offset value directly. Optionally, the safety task may be configured to return a timestamp, where the offset value has been added to the local clock value to generate a time value synchronized to the master clock time. The safety task is configured to perform the necessary integrity check on the offset value as it is read from the safety region 48, ensuring the integrity of the timestamp generated as a function of the offset value.

One problem facing all time synchronized systems is variation in the oscillator frequency between clock circuits 155. Even clock circuits constructed from identical components will have some variation due to manufacturing and material tolerances for the components within the clock circuit 155. Although the synchronization request message 200 is sent at periodic intervals to maintain synchronization of clock signals, the potential exists due, for example, to a drift between clock circuits, due to a write error within one of the devices, or due to some other failure within the clock circuit for the clock signals within two adjacent devices to have some variation. As a result, the present invention utilizes a clock skew detection to detect variation in the value of synchronized time between safety devices.

Figure 5:
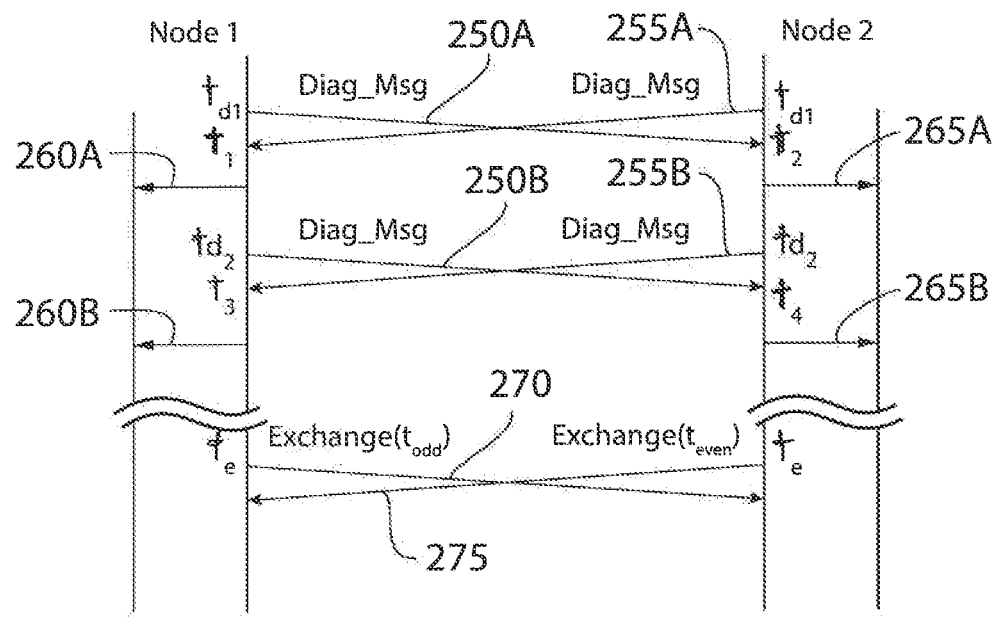
FIG. 5 is a timing diagram illustrating one embodiment of diagnostic messages between the devices synchronized in FIG. 4.

Turning next to FIG. 5, a sequence of messages may be transmitted between two safety devices to detect clock skew in a local clock. According to one aspect of the invention, it is contemplated that Node 1 shown in FIG. 5 will be the industrial controller 10 or 15 to which the second device, Node 2, is connected. Node 2 may be a device that is adjacent to Node 1 on the network, that is Node 2 may be just one hop away from Node 1. Alternately, Node 2 may be a device located multiple hops away from Node 1 on the industrial network. Node 1 and Node 2 are any two devices within the industrial control system which have clocks synchronized to each other. Whether the industrial controller 10, 15 provides the master time or is just synchronized to the master time, the industrial controller 10, 15 will serve as the primary clock for purposes of this discussion of skew detection.

Each node is configured to transmit a diagnostic message 250, 255 at the same time, $t_{d1}$. If the clocks are properly synchronized, each node will transmit their respective diagnostic message 250, 255 in tandem. If the transmission delay between nodes is symmetric in both directions, each node should receive the diagnostic message from the other node at the same time. In order to reduce the likelihood of an unusual transmission delay for one of the two diagnostic messages 250A, 255A causing an erroneous value of the timestamp, the skew detection routine may generate multiple diagnostic messages 250, 255 and use the receive time of the multiple messages for skew detection. As shown in FIG. 5, two of the first diagnostic messages 250A, 250B are shown and two of the second diagnostic messages 255A, 255B are shown. It is contemplated that the number of diagnostic messages 250, 255 transmitted for filtering may be configurable, ranging, for example, between two and ten. The timestamp of each first diagnostic message 250A, 250B being received is shown as an "even" timestamp (i.e., $t_2$, $t_4$, $t_6$, . . . ). The timestamp of each second diagnostic message 255A, 255B being received is shown as an "odd" timestamp (i.e., $t_1$, $t_3$, $t_5$, . . . ). The additional diagnostic messages are sent at a scheduled transmission time interval. The transmission time between additional diagnostic messages may be configurable according to the application requirements and may have a range, for example, from microseconds to milliseconds. According to one embodiment of the invention, the transmission interval for subsequent, additional diagnostic messages may be set to fifty microseconds.

The skew detection interval may be scheduled during commissioning of the system. An initial skew detection process may be scheduled after each synchronization message. Subsequent skew detection processes may be scheduled to occur, for example, once or twice between each synchronization message. Because each node has had its respective local time synchronized to the master time, each node can transmit a message based on the predefined schedule and, if there has been no skew in the clock signals, each message will be transmitted at the same time. Node 1 transmits a first diagnostic message 250A to Node 2, and Node 2 transmits a second diagnostic message 255A to Node 1. Node 1 generates a first timestamp, $t_1$, using the synchronized clock value at Node 1 upon receipt of the second diagnostic message 255A, and Node 2 generates a second timestamp, $t_2$, using the synchronized clock value at Node 2 upon receipt of the first diagnostic message 250A.

If transmission delays between nodes are symmetrical in both directions and if both clocks are maintaining a synchronous time, the first timestamp and the second timestamp should match each other. If the diagnostic system is executing on an industrial controller with a safety region 48 of memory 31, a safety task executing in Node 1 executes a first write 260A to the safety region 48 of memory 31 in the first node, and a safety task executing in Node 2 executes a second write 265A to the safety region 48 of memory 31 in the second node. The two timestamps are saved in safety memory for subsequent comparison to each other. The safety task executing in Node 1, will execute subsequent writes 260 to the safety region 48 of memory in the first node for each of the odd timestamps, and the safety task executing in Node 2 executes a second write 265 to the safety region 48 of memory 31 in the second node for each of the even timestamps. If the diagnostic system is executing on a processing device 60, such as those shown in FIG. 6, without a safety region 48 of memory, the processing device 60 writes the timestamps to memory available in the processing device 60. Just as with the initial synchronization messages, it is contemplated that either the processor 145 or a hardware circuit in the communication port 170 or a dedicated circuit located between the processor 145 and the communication port 170 may be configured in each node to capture the timestamp of the message as it is received.

At time, $t_e$, a pair of exchange messages is transmitted between each of the two nodes. A first exchange message 270 is transmitted from Node 1 to Node 2, and a second exchange message 275 is transmitted from Node 2 to Node 1. The first exchange message 270 includes each of the odd timestamps that were previously stored in Node 1, and the second exchange message 275 includes each of the even timestamps that were previously stored in Node 2. After each node has received the opposite exchange message, both nodes will have a complete set of timestamps, including both the odd and the even timestamps. Both nodes can then perform a comparison of the corresponding timestamps. For example, the first timestamp, $t_1$, is compared to the second timestamp, $t_2$, and the third timestamp, $t_3$, is compared to the fourth timestamp, $t_4$.

Because the clocks of both nodes have been synchronized to a master clock, each of the diagnostic messages and the exchange message should be transmitted in tandem from each node. In order to minimize transmission delays and to improve symmetry of the transmission delay in each direction, it may be desirable to reduce other traffic on the industrial network 65 during transmission of these messages. The industrial network 65 may be configured as a time synchronized network, using, for example, a time synchronization protocol such as that under development in the IEC/IEEE 60802 network profile, such that certain time intervals are reserved for specific messages or for messages having a particular priority. The network may reserve time intervals for the diagnostic messages 250, 255 and/or the exchange messages 270, 275 to reduce the potential for other network traffic impacting the skew detection.

According to another aspect of the invention, it is contemplated that the exchange messages 270, 275 may be eliminated and timestamps may be transmitted in the diagnostic messages instead. An initial diagnostic message may be sent with no timestamp. However, each subsequent diagnostic message would include the timestamp corresponding to the time at which the diagnostic message immediately prior to the one being sent was received. Each node could be configured to perform an ongoing skew detection by comparing the last two timestamps.

Each node is further configured to perform skew detection for its local clock signal. For purposes of discussion herein, the controller module 25, as shown in FIG. 1, will be a first node and one of the adapter modules 90 will be a second node. The adapter module 90 will have synchronized its clock circuit to the clock circuit in the controller module 25. The two modules will periodically transmit the diagnostic messages 250, 255 discussed above to each other to verify that the two clock circuits 155 remain synchronized. This example is for discussion purposes herein and is not intended to be limiting.

As indicated above, the timestamps of two corresponding diagnostic messages 250, 255 should be identical when the clock signals from each node are synchronized and the transmission between nodes is symmetrical. Comparing the timestamp at which each of the diagnostic messages is received may be used to detect clock skew between two time-synchronized nodes. According to one aspect of the invention, the processor 145 in the controller module 25 compares corresponding timestamps, such as the first timestamp, $t_1$, and the second timestamp, $t_2$, by subtracting the values of each timestamp. A difference between the two timestamps is stored in memory 150 of the controller module 25 as a delta time value. Optionally, the processor 145 may determine a first transmission time from the controller module 25 to the adapter module 90 and determine a second transmission time from the adapter module 90 to the controller module 25. The transmission times are determined as a function of the predefined time at which each node generates its respective diagnostic message 250, 255 and the first and second timestamps at which each node received the other diagnostic message. A difference between the two transmission times may then be stored in memory 150 of the controller module 25 as a delta time value. According to yet another embodiment of the invention, the values of the timestamps themselves may be stored in memory 150 and utilized for subsequent processing to perform clock skew detection. In still another embodiment, the offset value, as discussed above, may be stored in memory for clock skew detection.

Figure 10:
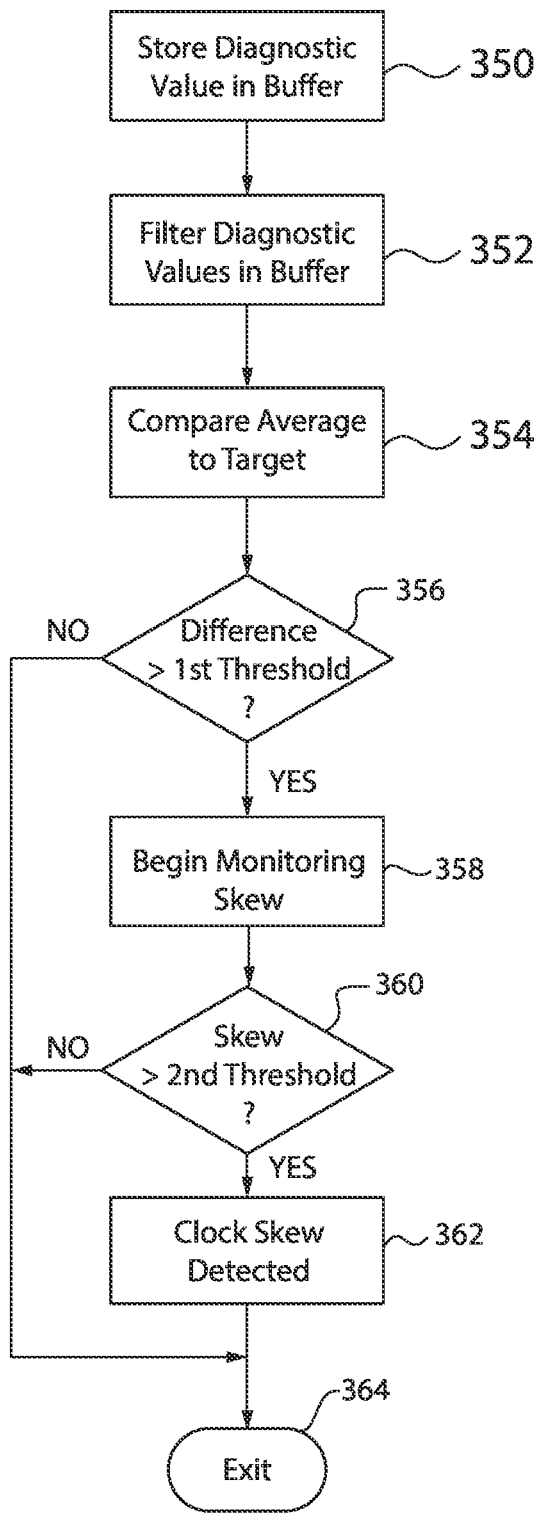
FIG. 10 is a flow diagram of steps involved in detecting clock skew according to one embodiment of the invention.

With reference to FIG. 10, an initial step in determining clock skew is storing the diagnostic values in memory. As shown in step 350, the selected diagnostic value may be stored in a buffer 153 (see also FIG. 2). The buffer 153 is preferably a first-in-first-out (FIFO) buffer, where new values of data are stored until the buffer is full. Once the FIFO buffer is full, another new value of data will overwrite the oldest value of data, and still further new values continually overwrite the oldest values. The FIFO buffer may store, for example, about forty data values. The length of the FIFO buffer may be increased up to about one hundred data values for improved statistical analysis on the stored values, as will be discussed in more detail below. As the length of the FIFO buffer increases, the computational intensity of processing may similarly increase. Thus, it is desirable to select a length of the FIFO buffer of sufficient length to obtain accurate detection of clock skew without causing excessive processing demands on the processor 145. According to one exemplary embodiment of the invention, the length of the FIFO buffer 153 is thirty-nine values, and the processor stores values of the difference determined between two timestamps at which corresponding diagnostic messages 250, 255 were received.

As previously indicated, there is inherently some variation in transmission delays between nodes. Often the transmission delays between two nodes will be asymmetrical as well creating some difference between the two timestamps. In order to avoid detecting clock skew on a single pair of timestamps with an unusually significant delay, it is desirable to filter the diagnostic values stored in the buffer 153, as shown in step 352 of FIG. 10. Determining a mean value of the values stored in the buffer 153 is one method of filtering the data. According to one aspect of the invention, the mean value may be a moving average of the values stored in the FIFO buffer 153. A moving average will determine a new mean value based on all of the values in the buffer 153 each time a new value is stored, where the moving average is the sum of each of the values divided by the length of the buffer. The moving average will serve to filter the data being stored in the buffer 153 reducing the impact of a single difference in values that is much larger than the other values. Alternately, a moving median average may be utilized to determine a new mean value. The moving median average first selects a window size, such as three to five values over which the processor 145 identifies a median value. After identifying the median value, the median value is used in the moving average. The moving median average similarly serves as a filter of the data being stored in the buffer 153 to reduce the impact of a single difference in values that is much larger than the other values. It is contemplated that still other methods of finding a mean value of the data in the buffer 153 may be utilized without deviating from the scope of the invention.

In addition to determining a mean value of the data in the FIFO buffer 153, the processor may be configured to determine a standard deviation for the data in the buffer. The standard deviation measures the amount of variation between the values stored in the FIFO buffer 153.

Figure 7A:
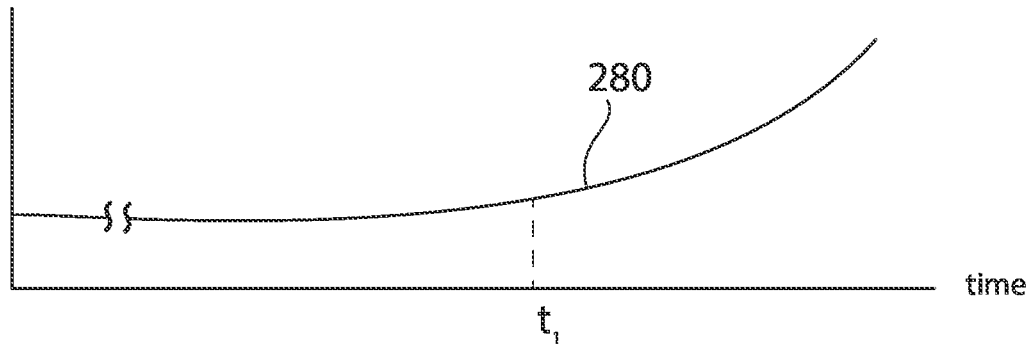
FIG. 7A is a graphical representation of a running average used for monitoring for clock skew according to one embodiment of the present invention.
Figure 7B:
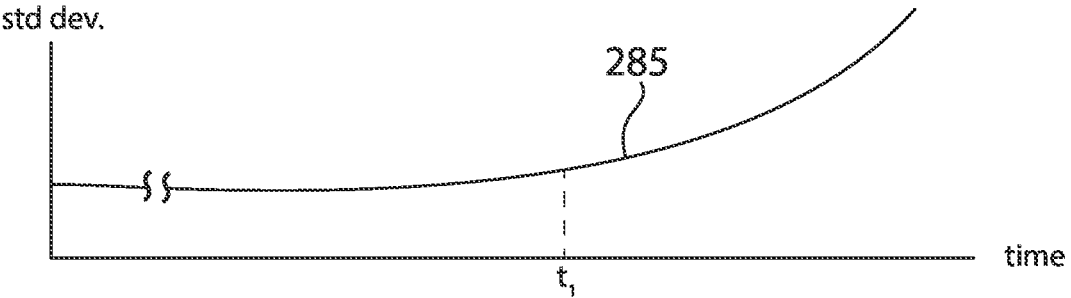
FIG. 7B is a graphical representation of a standard deviation used for monitoring for clock skew according to one embodiment of the present invention.

Over time, the mean value and the standard deviation may be utilized to detect clock skew between two adjacent nodes. With reference to FIGS. 7A and 7B, a first plot 280 illustrates a mean determined from the values stored in the FIFO buffer 153 with respect to time and a second plot 285 illustrates a standard deviation from the values stored in the FIFO buffer 153 with respect to time when clock skew occurs. When clock synchronization fails, one or both clock circuits 155 in adjacent nodes experience a drift in the value of the clock signal being generated. The drift remains in an upward or downward direction and may be a constant value or an increasing value of drift. According to the illustrated embodiment, clock skew begins to occur at about the time identified as $t_1$. Prior to the time, $t_1$, the mean and the standard deviation remain generally constant. Although some fluctuation occurs, a difference between two sequentially determined values remains small. After the time, t1, when clock skew begins, the mean value, illustrated in the first plot 280, begins to change rapidly in comparison to the mean value observed prior to clock skew. Although the standard deviation, illustrated in the second plot 285, will begin to change, the change is not as rapid as the change observed in the mean value. If the change in the mean value becomes too great, the processor 145 determines that the clock signals are skewing. According to a first aspect of the invention, a first method for detecting clock skew utilizes a safety threshold. The safety threshold is compared against an absolute value of the difference between the mean value plus or minus the standard deviation. According to one aspect of the invention, the safety threshold is set to ten microseconds. Preferably, the safety threshold is set to about two microseconds. According to another aspect of the invention, a specific safety threshold may not be available. Alternately, a ratio of the mean to the standard deviation may be evaluated. If the mean becomes substantially larger than the standard deviation, clock skew is detected. It is contemplated that a ratio of at least ten may be utilized to detect clock skew. Preferably, clock skew is detected if the ratio of the mean value to the standard deviation is greater than six. If clock skew is detected, the processor 145 may request that the clock circuits 155 be resynchronized, generate a fault or warning message, or a combination of the above.

Figure 8:
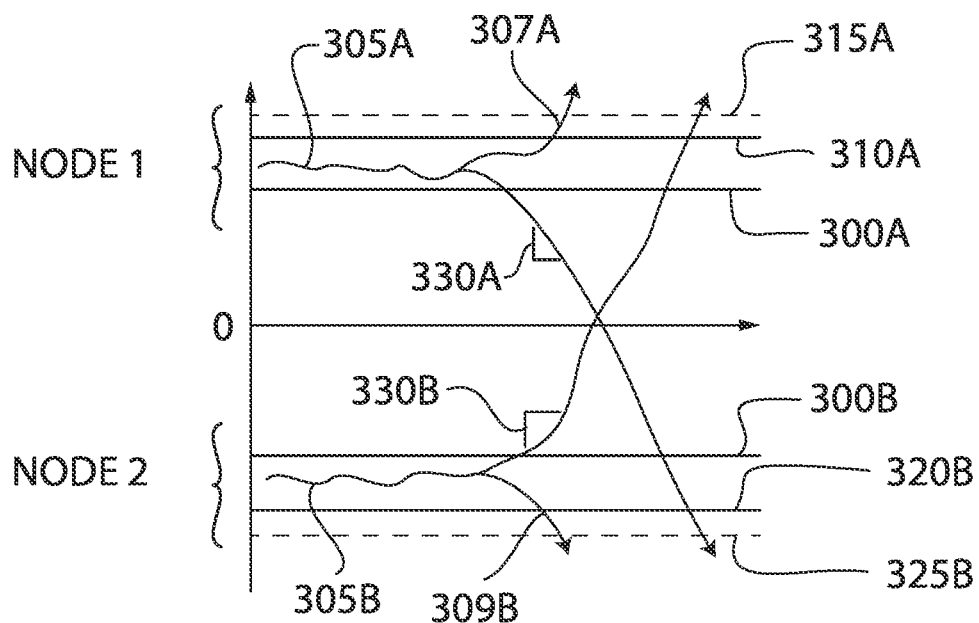
FIG. 8 is a graphical representation of a hybrid cumulative summation monitoring for clock skew according to one embodiment of the present invention.
Figure 9:
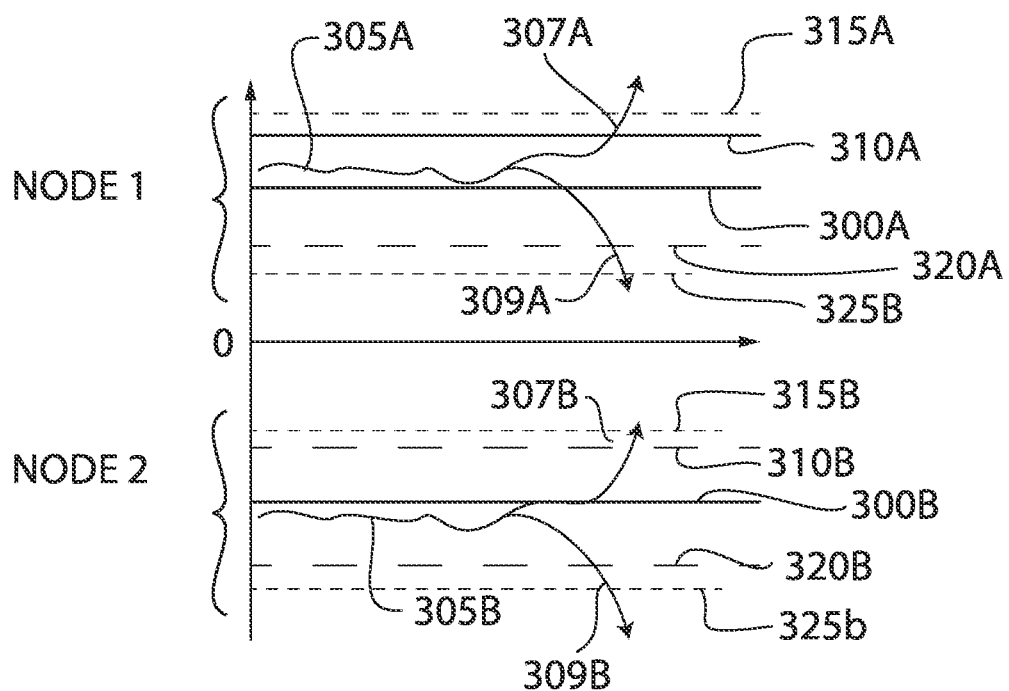
FIG. 9 is a graphical representation of a conjugate cumulative summation monitoring for clock skew according to one embodiment of the present invention.

Turning next to FIGS. 8 and 9, it is contemplated that the change in the mean value may be used to detect clock skew between adjacent nodes. As an initial step, a node is configured to determine a target mean value 300. The target mean value 300 may be determined during an initial commissioning period in which multiple diagnostic messages 250, 255 are transmitted between two nodes. During this commissioning period, the processor 145 determines the mean value and sets this mean value as a target mean value 300. Once the commissioning period is complete, the target mean value is used to detect clock skew. The processor in a node monitoring for clock skew will continue to determine a mean value for the values in the FIFO buffer 153 as previously discussed. The ongoing, actual mean value 305 is compared to the target mean value 300, as indicated in step 354 of FIG. 10.

FIG. 8 illustrates an example in which both nodes, Node 1 and Node 2, are monitoring for clock skew. Because the two nodes are communicating with each other and because each node assigns a first timestamp, $t_1$, to the time it receives a diagnostic message and a second timestamp, $t_2$, to the time the other node with which it is communicating receives a diagnostic message, the values of the timestamps will be inverted for the two nodes. In other words, the first timestamp observed by Node 1 is equal to the second timestamp observed by Node 2, and the second timestamp observed by Node 1 is equal to the first timestamp observed by Node 2. When each node determines a difference between the two timestamps, the result will be an equal amplitude with opposite polarity. Thus, Node 1 determines a first target mean value 300A during commissioning and a first actual mean value 305A, while Node 2 determines a second target mean value 300B during commissioning and a second actual mean value 305B. The amplitude of each is identical, but the polarity is opposite. For the illustrated example, Node 1 has been assigned a positive amplitude, above the zero line and Node 2 has been assigned a negative amplitude, below the zero line.

As further indicated in FIG. 10, the difference between the actual mean value 305 and the target mean value 300 is compared to a threshold at step 356. With respect to Node 1, a first positive threshold value 310A is defined. When the actual mean value 305A is greater than the target mean value 300A but less than the first positive threshold, no error is detected. This allows for some variation in the actual mean value 305A without detecting clock skew, and the processor 145 skips from step 356 to step 364, exiting the skew detection routine until the next cycle through. When the actual mean value 305A is greater than both the target mean value 300A and the first positive threshold 310A, the processor 145 begins monitoring for clock skew as indicated at step 358.

When monitoring for clock skew, a processor 145 may determine a cumulative summation 307, 309 of the actual mean values 305. Because a clock circuit 155 will tend to drift in one direction, the actual mean values 305 will continue to grow in a positive or negative direction once clock skew begins. A cumulative summation may be used to more quickly detect the growing positive or negative value of the actual mean value. According to one embodiment of the invention, a difference between the actual mean value 305 and the target mean value 300 is determined for each new actual mean value. This difference is added to a prior cumulative summation value when the actual mean value is greater than the first positive threshold 310A. As clock skew continues, the value of the difference between the actual value and the target value increases. Because a cumulative summation of the difference is determined, not only is the difference growing in each scan, but the difference is added the prior cumulative summation and the cumulative summation grows at a greater rate compared to just the difference between the actual and target values. A positive cumulative summation curve 307A is illustrated in FIG. 8 for Node 1 and a negative cumulative summation curve 309B is illustrated in FIG. 8 for Node 2. The processor 145 begins comparing the cumulative summation curves 307, 309 to a second threshold value 315, 325. For Node 1, the positive cumulative summation curve 307A is compared to a second positive threshold 315A. At step 362, when the positive cumulative summation curve 307A exceeds the second positive threshold 315A, the processor determines that the difference in clock signals between the two nodes is too great and clock skew is detected.

If both nodes, Node 1 and Node 2, are monitoring for clock skew, Node 2 will observe an inverse skew to that detected in Node 1. As shown in FIG. 8, the actual mean value 305B is normally slightly less than the target mean value 300B. As Node 1 detects drift in the positive direction, Node 2 detects drift in a negative direction. Node 2 compares the actual mean value 305B to a first negative threshold 320B. When the actual mean value 305B is less than the target mean value 300B but greater than the first negative threshold 320B, no error is detected. When the actual mean value 305B is less than both the target mean value 300B and the first negative threshold 320B, the processor 145 begins monitoring for clock skew. On Node 2, the processor begins determining a negative summation curve 309B and compares the negative summation curve 309B to a second negative threshold 325B. When the negative summation curve 309B exceeds the second negative threshold 325B, the processor determines that the difference in clock signals between the two nodes is too great and clock skew is detected.

FIG. 8 illustrates a hybrid approach for clock skew detection. A single threshold, or a single pair of thresholds, is provided for skew detection. The thresholds may be used for detection of clock skew in both positive and negative directions. This single threshold method would be suitable for use if the target mean value 300 were equal to zero. However, as discussed above, there is some inherent variability in network communication, and it is expected that the target mean value 300 will be a non-zero value. For Node 1, the non-zero target mean value 300A is positive, and for Node 2, the non-zero target mean value 300B is negative. Thus, a first threshold value 310A which is suitable for Node 1 to use in the positive direction would not be suitable for Node 1 to use to detect clock skew in a negative direction. Due the symmetrical, but opposite polarities of Node 1 and Node 2, the negative value of the first threshold value 310 would equal the negative threshold value 320B used by Node 2. The same threshold values for positive as well as negative detection of clock drift would allow the clock signal in Node 1 to drift for a substantial time in the negative direction and for a significant offset before skew is detected. This long delay in detecting negative clock drift on Node 1 or positive clock drift in Node 2 is undesirable. In order to detect negative clock drift on Node 1 or positive clock drift in Node 2 more rapidly, each node utilizes the slope 330 of the actual mean value 305. If the slope 330 exceeds a predefined threshold, then skew detection is detected. The absolute value of the slope may first be taken, such that the absolute value may be compared to a single threshold value for the slope.

Turning next to FIG. 9, it is contemplated that each node may include two threshold values, such that different pairs of thresholds are used to detect clock skew from a positive target mean 300A and from a negative target mean 300B. Node 1 includes a first positive threshold 310A and a first negative threshold 320A. The terms positive and negative with respect to the first positive threshold 310A and the first negative threshold 320A indicate a value greater than or less than the target mean 300A for Node 1. The polarity of the value assigned to both thresholds may be positive. Similarly, Node 2 includes a second positive threshold 310B and a second negative threshold 320B. The terms positive and negative with respect to the second positive threshold 310B and the second negative threshold 320B indicate a value greater than or less than the target mean 300B for Node 2. The polarity of the value assigned to both thresholds may be negative. When the mean value 305 deviates from the target mean value 300 either above or below the target mean by a sufficient amount such that it exceeds the positive threshold 310 or negative threshold 320, a cumulative sum begins to be calculated.

As illustrated in FIG. 9, a first positive cumulative sum value 307A is maintained when the first mean value 305A exceeds the first positive threshold 310A, and a first negative cumulative sum value 309A is maintained when the first mean value 305A exceeds the first negative threshold 320A. Similarly, a second positive cumulative sum value 307B is maintained when the second mean value 305B exceeds the second positive threshold 310B, and a second negative cumulative sum value 309B is maintained when the second mean value 305B exceeds the second negative threshold 320A. An additional positive threshold 315 and an additional negative threshold 325 are stored in each node, against which the positive and negative cumulative sums 307, 309, respectively are compared to detect clock skew.

In addition to detecting skew of the clock signals between two devices, each node may be configured to detect drift of the clock signal locally. With reference to FIG. 3, the clock circuit 155 includes a first oscillator 157 and a second oscillator 159. The first oscillator 157 is configured to generate the local time signal for each device as discussed above. The second oscillator 159 is configured to generate a diagnostic clock signal. The frequency of the first oscillator 157 and of the second oscillator 159 may be known within manufacturing tolerances and each device may include an initial expected value of the frequency. It is further contemplated that, at power up, during a commissioning step, or the like, each device may sample the oscillator frequency to determine a precise value of the corresponding oscillator frequencies. Each oscillator drives a respective free-running clock. Having a precise value of the oscillator frequency, the output of each oscillator may be scaled to drive the respective free-running clocks to the same time. Each device may execute a frequent comparison of the two free-running clocks to detect local drift of one of the two oscillators 157, 159. The frequency of comparison would coincide to a safety reaction time of the device, where the safety reaction time may be, for example, between three and ten milliseconds. Thus, the drift diagnostic may occur more frequently than the skew detection and may verify that the local clock is not drifting between comparisons of the clock frequency to the clock in another device. Because the two oscillators are local on the device and because there is no need to transmit data between devices over the network 65, the two free-running clocks should remain closely synchronized. If a difference between the two free running clocks exceeds, for example, five microseconds, an alarm message may be generated and, if the difference between the two free running clocks exceeds, for example, ten microseconds, the device may generate a fault message, indicating that the industrial controller 10, 15 should bring the controlled machine or process to a safe operating state.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method of monitoring clock circuits for use in a safety rated application, the method comprising the steps of:
   synchronizing a first clock in a first node with a second clock in a second node;
   transmitting a first diagnostic message from the first node to the second node at a first time based on the first clock;
   transmitting a second diagnostic message from the second node to the first node at the first time based on the second clock;
   generating a first diagnostic timestamp in the first node corresponding to receipt of the second diagnostic message;
   generating a second diagnostic timestamp in the second node corresponding to receipt of the first diagnostic message;
   transmitting the first diagnostic timestamp from the first node to the second node;
   transmitting the second diagnostic timestamp from the second node to the first node;
   storing a diagnostic value in a buffer for either the first node or the second node, wherein the diagnostic value is determined as a function of the first diagnostic timestamp and the second diagnostic timestamp; and
   determining a clock skew between the first clock and the second clock as a function of the diagnostic value in either the first node or the second node.

2. The method of claim 1, wherein the diagnostic value is a difference between the first diagnostic timestamp and the second diagnostic timestamp.

3. The method of claim 1, further comprising the steps of:
   determining a first transmission time for the first diagnostic message from the first node to the second node as a difference between the first time and the second diagnostic timestamp; and
   determining a second transmission time for the second diagnostic message from the second node to the first node as a difference between the first time and the first diagnostic timestamp, wherein the diagnostic value is a difference between the first transmission time and the second transmission time.

4. The method of claim 1, further comprising the step of determining an offset time value between the first clock and the second clock as a function of the first time, the first diagnostic timestamp, and the second diagnostic timestamp, wherein the diagnostic value is the offset time value.

5. The method of claim 1, wherein the step of determining the clock skew further comprises the steps of:
   storing a plurality of values for the diagnostic value in the buffer in a first-in, first-out configuration; and
   determining a mean value of the plurality of values in the buffer.

6. The method of claim 5, further comprising the step of determining a standard deviation of the plurality of values in the buffer, wherein the clock skew between the first clock and the second clock is determined as a function of the mean value and the standard deviation.

7. The method of claim 5, wherein the step of determining the clock skew further comprises the steps of:
   determining a difference between the mean value and a target mean value; and
   maintaining a cumulative summation of the difference between the mean value and a target mean value when the difference exceeds a predefined threshold.

8. The method of claim 7, wherein the step of determining the clock skew further comprises the steps of:
   determining a clock skew in a first polarity when the cumulative summation exceeds a second predefined threshold,
   determining a slope of the mean value with respect to time, and
   determining a clock skew in a second polarity, opposite the first polarity, when the slope of the mean value exceeds a third predefined threshold.

9. The method of claim 7, wherein:
   the step of maintaining the cumulative summation of the difference between the mean value and the target mean value when the difference exceeds the predefined threshold further comprises the steps of:
   maintaining a first cumulative summation when the difference exceeds a first predefined threshold, and
   maintaining a second cumulative summation when the difference exceeds a second predefined threshold; and
   the step of determining the clock skew further comprises the steps of:
   determining the clock skew in a first polarity when the first cumulative summation exceeds a third predefined threshold, and
   determining the clock skew in a second polarity, opposite the first polarity, when the second cumulative summation exceeds a fourth predefined threshold.

10. A node in an industrial control system configured to generate a clock signal for use in a safety rated application, the node comprising:
    a communication port configured to connect to an industrial network for communication with at least one additional node on the industrial network;
    a clock circuit generating a first clock signal; and
    a processor configured to:
    synchronize the first clock signal with a second clock signal in the at least one additional node;

transmit a first diagnostic message to the at least one additional node at a first time based on the first clock signal;

receive a second diagnostic message from the at least one additional node, wherein the second diagnostic message is transferred from the at least one additional node at the first time based on the second clock signal;

generate a first diagnostic timestamp as a function of the first clock signal corresponding to receipt of the second diagnostic message;

receive a second diagnostic timestamp from the at least one additional node, wherein the second diagnostic timestamp corresponds to a time at which the at least one additional node received the first diagnostic message;

store a diagnostic value in a buffer, wherein the diagnostic value is determined as a function of the first diagnostic timestamp and the second diagnostic timestamp; and determine a clock skew between the first clock signal and the second clock signal as a function of the diagnostic value.

11. The node of claim 10, wherein the diagnostic value is a difference between the first diagnostic timestamp and the second diagnostic timestamp.

12. The node of claim 10, wherein the processor is further configured to:

determine a first transmission time for the first diagnostic message from the first node to the second node as a difference between the first time and the second diagnostic timestamp; and determine a second transmission time for the second diagnostic message from the second node to the first node as a difference between the first time and the first diagnostic timestamp, wherein the diagnostic value is a difference between the first transmission time and the second transmission time.

13. The node of claim 10 wherein the processor is further configured to determine an offset time value between the first clock signal and the second clock signal as a function of the first time, the first diagnostic timestamp, and the second diagnostic timestamp, wherein the diagnostic value is the offset time value.

14. The node of claim 10, wherein the processor is further configured to determine the clock skew by:

storing a plurality of values for the diagnostic value in the buffer in a first-in, first-out configuration; and determining a mean value of the plurality of values in the buffer.

15. The node of claim 14, wherein the processor is further configured to determine the clock skew by:

determining a standard deviation of the plurality of values in the buffer, and determining the clock skew as a function of the mean value and the standard deviation.

16. The node of claim 14, wherein the processor is further configured to determine the clock skew by:

determining a difference between the mean value and a target mean value; and maintaining a cumulative summation of the difference between the mean value and a target mean value when the difference exceeds a predefined threshold.

17. The node of claim 16, wherein the processor is further configured to determine the clock skew by:

determining a clock skew in a first polarity when the cumulative summation exceeds a second predefined threshold, determining a slope of the mean value with respect to time, and determining a clock skew in a second polarity, opposite the first polarity, when the slope of the mean value exceeds a third predefined threshold.

18. The node of claim 16, wherein the processor is further configured to determine the clock skew by:

maintaining a first cumulative summation when the difference exceeds a first predefined threshold, maintaining a second cumulative summation when the difference exceeds a second predefined threshold, determining the clock skew in a first polarity when the first cumulative summation exceeds a third predefined threshold, and determining the clock skew in a second polarity, opposite the first polarity, when the second cumulative summation exceeds a fourth predefined threshold.

19. A method of generating a safety rated time value for use in a safety rated application, the method comprising the steps of:

determining an offset time value between a master clock and a first node in the safety rated application;

storing the offset time value in a safety memory of the first node;

generating timestamps in the first node as a function of a first clock and the offset time;

transmitting a first diagnostic message from the first node to a second node at a first time based on the first clock;

transmitting a second diagnostic message from the second node to the first node at the first time based on a second clock in the second node; and detecting a clock skew between the local clock and the master clock as a function of the diagnostic messages.

20. The method of claim 19, wherein the step of detecting the clock skew further comprises:

storing a plurality of values of a diagnostic value in a buffer, wherein the diagnostic value is a function of the transmission time of either the first or second diagnostic messages;

determining a mean value of the plurality of values in the buffer;

determining a cumulative summation of a difference between the mean value and a target mean value; and detecting the clock skew when the difference exceeds a predefined threshold.

* * * * *